Feb. 8, 1966  C. R. SAUBER  3,234,447
MOTOR SPEED CONTROL CIRCUIT
Filed Nov. 6, 1962  2 Sheets-Sheet 2

CHARLES R. SAUBER
INVENTOR
KENDRICK AND STOLZY
BY
ATTORNEYS

United States Patent Office 3,234,447
Patented Feb. 8, 1966

3,234,447
MOTOR SPEED CONTROL CIRCUIT
Charles R. Sauber, El Segundo, Calif., assignor to El-Tronics, Inc., Warren, Pa., a corporation of Pennsylvania
Filed Nov. 6, 1962, Ser. No. 235,706
3 Claims. (Cl. 318—327)

This invention relates to control systems, and more particularly to a circuit for automatically maintaining an operating characteristic of a device constant.

Although the device of the present invention may have other applications and is not to be limited to any specific use set forth herein, it has been found to have unusual utility to control the speed of a direct-current motor employed in apparatus for recording sound on or reproducing sound from a magnetic wire or tape. Such devices have been employed in automobiles and have been operated off of automobile batteries.

Automobile batteries of the twelve volt type often provide an output voltage varying between nine and eighteen volts. This therefore makes it impossible to run a direct-current motor on such batteries and achieve anything like a constant motor speed which is required in the operation of a magnetic tape machine.

The present invention overcomes the above-described and other disadvantages of the prior art by providing means for deriving a direct-current analog voltage proportional to an operating characteristic of a device to be controlled, means for providing a constant regulated direct-current voltage, and means for controlling the device to change the characteristic in a manner to reduce the difference between the analog and constant voltages to zero.

Such a servomechanism may be employed in a direct-current motor speed control circuit including means for deriving a direct-current analog voltage having a magnitude proportional to the speed of the motor, means for providing a direct-current reference voltage of a constant amplitude, and means for energizing the motor with a voltage proportional to the difference between the analog and constant voltages.

In accordance with the foregoing, it will be appreciated that an unusually useful direct-current motor speed control circuit may be constructed embodying a regulated source of direct-current voltage. In accordance with an outstanding feature of the present invention, this source may be a back-biased Zener diode operated at a back-bias sufficient to break the same down into heavy conduction.

Another important feature of the present invention resides in the use of a Zener diode to regulate portions of the circuit for deriving a direct-current analog voltage of motor speed.

A further feature of the present invention resides in the use of a combination of transistors and Zener diodes for motor control.

By use of the foregoing construction, it has been possible to reduce the speed control error of motor control circuits of the prior art by more than 80%.

The present invention will be better understood from the following description when considered in connection with the accompanying drawings.

In the drawings which are to be regarded as merely illustrative:

Figure 1:
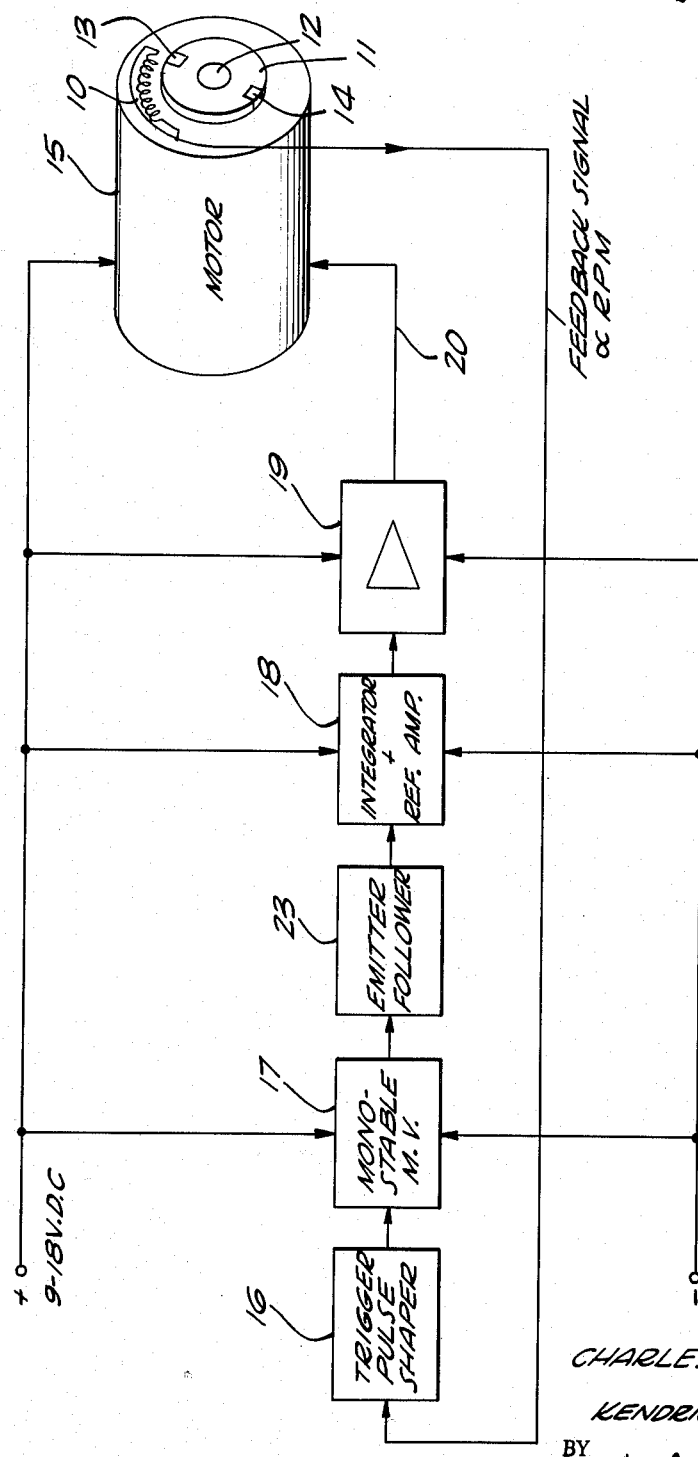
FIG. 1 is a block diagram of the control circuit of the present invention.

As shown in FIG. 1, the coil 10 is positioned around the periphery of a disc 11 fixed to the motor drive shaft 12 which disc has two magnets 13 and 14 in the periphery thereof to induce a voltage in the coil 10 for each half revolution of the drive shaft 12. Shaft 12 is the shaft of a direct-current motor 15. The output pulses of coil 10 are shaped in shaper 16 which drives a multivibrator 17 that produces output pulses of constant amplitude and time width at a frequency proportional to the speed of shaft 12. The multivibrator 17 is a monostable multivibrator. It drives an integrator 18 which produces an output direct-current voltage that is proportional to the speed of shaft 12. Block 23 is an emitter follower that is connected between multivibrator 17 and integrator 18. The voltage proportional to the speed of shaft 12 is compared with a reference voltage in a comparator 19 which produces a control voltage at output 20 proportional to the difference between the output of integrator 18 and the reference voltage.

Figure 2:
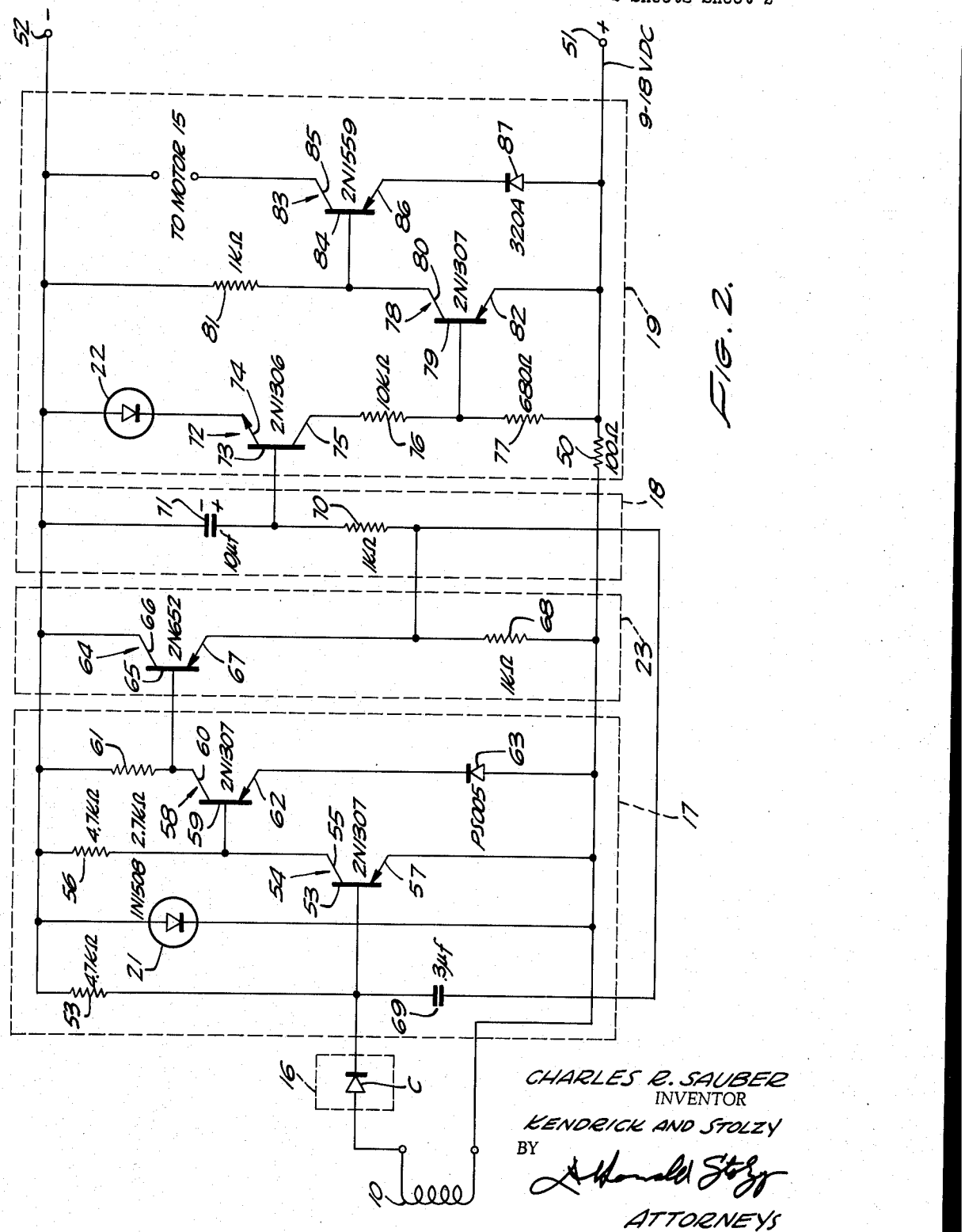
FIG. 2 is a schematic diagram of the circuit shown in FIG. 1.

In FIG. 2, a diode C is connected in series with coil 10. Diode 21 and diode 22 are Zener diodes having predetermined reverse breakdown voltages. The reference voltage which is compared with the output of integrator 18 is supplied by Zener diode 22.

In FIG. 2, a dropping resistor 50 is connected serially with a second power supplying lead 51. Zener diode 21 is connected from resistor 50 to a first power supply lead 52. A resistor 53 is connected from first lead 52 to a base 53 of a transistor 54. Coil 10 is connected from resistor 50 to diode 16. Diode 16 is connected to base 53 of transistor 54. A collector 55 of transistor 54 is connected to first lead 52 through a resistor 56. Transistor 54 is provided with an emitter 57 which is connected to resistor 50. A transistor 58 is provided with a base 59 connected to collector 55, a collector 60 connected to lead 52 through a resistor 61, and an emitter 62 connected through a diode 63 to resistor 50.

A transistor 64 is provided with a base 65 connected to collector 60, a collector 66 connected to first lead 52, and an emitter 67 connected to resistor 50 through a resistor 68. A feedback capacitor 69 is connected from emitter 67 to base 53. A resistor 70 is connected from emitter 67 through a capacitor 71 to first lead 52.

A transistor 72 is provided with a base 73 connected from the junction of resistor 70 and capacitor 71. Transistor 72 is provided with an emitter 74 that is connected to first lead 52 through Zener diode 22. Transistor 72 is provided with a collector 75 that is connected to first lead 51 through resistors 76 and 77. A transistor 78 is provided with a base 79 connected to the junction of resistors 76 and 77, a collector 80 connected to first lead 52 through a resistor 81, and an emitter 82 connected to second lead 51. A transistor 83 is also provided having a base 84 connected to collector 80, a collector 85 connected to motor 15, and an emitter 86 connected to second lead 51 through a diode 87. Note will be taken that first lead 52 is also connected to motor 15.

From the foregoing, it will be appreciated that an unusually useful motor control circuit is provided including the use of Zener diode 22 as a regulating reference. Further, the use of Zener diode 21 makes it possible to regulate the voltages across the amplifiers 54 and 58 and emitter follower 64 for accurate pulse generation. Still further, the use of Zener diodes 21 and 22 with the transistors in the circuit of FIG. 2 makes a highly accurate regulated low voltage servomechanism possible to construct.

Although only one specific embodiment of the present invention has been described and illustrated, many changes and modifications thereof will of course suggest themselves to those skilled in the art. The true scope of the invention is therefore not to be limited to the embodiment selected for this disclosure, the true scope of the invention being defined only in the appended claims.

What is claimed is:
1. A direct-current motor speed control circuit comprising: a pulse generator for periodically producing voltage pulses of a constant amplitude and time width having a repetition frequency directly proportional to the speed of said motor; first and second power supply leads; a transistor having a base, an emitter and a collector; a resistor connected from said pulse generator to said base; a capacitor connected from said base to said first lead; a Zener diode connected between said first lead and said emitter and poled to be back-biased; resistor means connecting said collector to said second lead; and means for energizing said motor with a direct-current voltage of a magnitude proportional to the potential of said collector relative to that of said first lead.

2. A speed control circuit comprising: first and second power supply leads; a first resistor in series with said second power supply lead; a Zener diode connected between said first lead and said first resistor and poled to be back-biased; a first transistor having a base, an emitter, and a collector; a second resistor connected from said first lead to said collector of said first transistor, said emitter of said first transistor being connected to said first resistor; a third resistor connected from said first lead to said base of said first transistor; means to supply voltage pulses between said base of said first transistor and said first resistor; a second transistor having a base, an emitter and a collector; a fourth resistor connected from said first lead to said collector of said second transistor, said base of said second transistor being connected to said collector of said first transistor and said emitter of said second transistor being connected with said first resistor; a third transistor having a base connected to said collector of said second transistor and a collector connected to said first lead, said third transistor also having an emitter; a fifth resistor connected from said emitter of said third transistor to said first resistor; a first capacitor connected from said emitter of said third transistor to said base of said first transistor; a sixth resistor and a second capacitor connected serially from said emitter of said third transistor to said first lead, the connection of said sixth transistor with said second capacitor forming a first junction; means for providing a direct-current reference voltage of a constant amplitude; and means connected with said first junction for producing a direct-current voltage of a magnitude proportional to the difference between said constant voltage and the voltage appearing across said second capacitor.

3. A speed control circuit comprising: first and second power supply leads; a first resistor in series with said second power supply lead; a Zener diode connected between said first lead and said first resistor and poled to be back-biased; a first transistor having a base, an emitter, and a collector; a second resistor connected from said first lead to said collector of said first transistor, said emitter of said first transistor being connected to said first resistor; a third resistor connected from said first lead to said base of said first transistor; means to supply voltage pulses between said base of said first transistor and said first resistor; a second transistor having a base, an emitter and a collector; a fourth resistor connected from said first lead to said collector of said second transistor, said base of said second transistor being connected to said collector of said first transistor and said emitter of said second transistor being connected with said first resistor; a third transistor having a base connected to said collector of said second transistor and a collector connected to said first lead, said third transistor also having an emitter; a fifth resistor connected from said emitter of said third transistor to said first resistor; a first capacitor connected from said emitter of said third transistor to said base of said first transistor; a sixth resistor and a second capacitor connected serially from said emitter of said third transistor to said first lead, the connection of said sixth resistor with said second capacitor forming a first junction; a fourth transistor having a base, an emitter and collector, said base being connected to said first junction, said first, second and third transistors being of one conductivity type and said fourth transistor being of a conductivity type opposite that of said first, second and third transistors; a Zener diode connected from said first lead to said emitter of said fourth transistor and poled to be back-biased; seventh and eighth resistors connected serially from said collector of said fourth transistor to said second lead, the mutual connection of said seventh and eighth resistors forming a second junction; and means for producing a direct-current voltage of a magnitude proportional to the potential of said second junction relative to that of said first lead.

References Cited by the Examiner
UNITED STATES PATENTS

| | | | |
|---|---|---|---|
| 2,782,355 | 2/1957 | Wilcox | 318—318 X |
| 2,809,339 | 10/1957 | Guggi | 318—327 |
| 2,977,523 | 3/1961 | Cockrell | 318—331 |
| 2,991,407 | 7/1961 | Murphy. | |
| 3,001,116 | 9/1961 | Shih | 318—448 |
| 3,024,401 | 3/1962 | Dinger | 318—327 X |
| 3,047,820 | 7/1962 | Lawton | 307—88.5 |
| 3,106,684 | 10/1963 | Luik | 307—88.5 |

OTHER REFERENCES

Publication: Motorola Silicon Zener Diode and Rectifier Handbook, 1961, Phoenix, Arizona, TK 7872, S4M66, 1961, pp. 27 and 47.

ORIS L. RADER, *Primary Examiner.*